United States Patent
Heikkila

(10) Patent No.: US 11,467,324 B2
(45) Date of Patent: *Oct. 11, 2022

(54) COMPLEX RETROREFLECTIVE BEAD

(71) Applicant: Tundra Composites, LLC, White Bear Lake, MN (US)

(72) Inventor: Kurt Heikkila, Marine on the Saint Croix, MN (US)

(73) Assignee: Tundra Composits, LLC, White Bear Lake, MN (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/662,421

(22) Filed: Oct. 24, 2019

(65) Prior Publication Data

US 2020/0132896 A1 Apr. 30, 2020

Related U.S. Application Data

(60) Provisional application No. 62/751,065, filed on Oct. 26, 2018.

(51) Int. Cl.
*G02B 5/13* (2006.01)
*E01F 9/524* (2016.01)

(52) U.S. Cl.
CPC ............... *G02B 5/13* (2013.01); *E01F 9/524* (2016.02)

(58) Field of Classification Search
None
See application file for complete search history.

(56) References Cited

U.S. PATENT DOCUMENTS

| | | |
|---|---|---|
| 2,268,537 A | 12/1941 | Leroy |
| 2,326,634 A | 8/1943 | Gebhard et al. |
| 2,379,702 A | 7/1945 | Gebhard |
| 2,610,922 A | 9/1952 | Beck |
| 2,687,968 A | 8/1954 | Beck |
| 2,790,723 A | 4/1957 | Stradley et al. |
| 2,842,446 A | 7/1958 | Beck et al. |
| 2,853,393 A | 9/1958 | Beck et al. |
| 2,883,347 A | 4/1959 | Fisher et al. |
| 2,963,378 A | 12/1960 | Palmquist et al. |
| 3,365,315 A | 1/1968 | Beck et al. |
| 4,336,092 A | 6/1982 | Wasserman |
| 4,697,407 A | 10/1987 | Wasserman |
| 4,983,458 A | 1/1991 | Dejaiffe |
| 5,057,552 A | 10/1991 | Cavitt et al. |
| 5,169,558 A | 12/1992 | Smrt et al. |
| 5,670,209 A | 9/1997 | Wyckoff |

(Continued)

OTHER PUBLICATIONS

3M Glass Bubbles iM16K, 2017, St. Paul, MN 55144.

(Continued)

*Primary Examiner* — Jennifer D. Carruth
(74) *Attorney, Agent, or Firm* — Mark DiPietro; Fred C. Morgan

(57) ABSTRACT

A retroreflective composite bead for highway marking having high retroreflectivity both when initially installed and over the bead lifetime, allowing vehicle drivers to see highway marking lines at night and in adverse conditions during nighttime. When installed the retroreflective beads essentially retroreflect the base color of the highway marking material in which the retroreflective beads are embedded. The beads comprise a larger bead with a coating of smaller particles heat bonded to its surface.

11 Claims, 5 Drawing Sheets

(56) References Cited

U.S. PATENT DOCUMENTS

| | | | |
|---|---|---|---|
| 5,750,191 A | 5/1998 | Hachey et al. | |
| 5,853,846 A | 12/1998 | Clark et al. | |
| 5,880,176 A | 3/1999 | Kamoto et al. | |
| 5,900,978 A | 5/1999 | Sagar et al. | |
| 5,928,761 A | 7/1999 | Hedblom et al. | |
| 5,942,280 A * | 8/1999 | Mathers | E01F 9/524 427/163.4 |
| 5,947,632 A | 9/1999 | Pirotta et al. | |
| 5,948,833 A | 9/1999 | Jilek et al. | |
| 5,962,108 A | 10/1999 | Nestegard et al. | |
| 5,973,028 A | 10/1999 | Maxwell et al. | |
| 6,011,085 A | 1/2000 | Maxwell et al. | |
| 6,048,915 A | 4/2000 | Clamen et al. | |
| 6,075,079 A | 6/2000 | Helmer et al. | |
| 6,132,132 A | 10/2000 | Pirotta et al. | |
| 6,194,486 B1 | 2/2001 | Yujiri et al. | |
| 6,228,901 B1 | 5/2001 | Brown et al. | |
| 6,277,437 B1 | 8/2001 | Helmer et al. | |
| 6,301,770 B1 | 10/2001 | McIlwraith | |
| 6,335,083 B1 | 1/2002 | Kasai et al. | |
| 6,365,262 B1 | 4/2002 | Hedblom et al. | |
| 6,376,574 B1 | 4/2002 | Helmer et al. | |
| 6,451,874 B1 | 9/2002 | Purgett et al. | |
| 6,479,132 B2 | 11/2002 | Hedblom et al. | |
| 6,479,417 B2 | 11/2002 | Frey et al. | |
| 6,514,892 B1 | 2/2003 | Kasai et al. | |
| 6,689,824 B2 | 2/2004 | Friel et al. | |
| 6,734,226 B2 | 5/2004 | Hermes | |
| 6,734,227 B2 | 5/2004 | Jing et al. | |
| 6,911,486 B2 | 6/2005 | Mimura et al. | |
| 7,506,523 B2 | 3/2009 | Beck | |
| 7,900,474 B2 | 3/2011 | Beck | |
| 8,033,671 B1 | 10/2011 | Nilsen et al. | |
| 8,202,614 B2 | 6/2012 | Koene et al. | |
| 8,292,539 B2 | 10/2012 | Gelfant et al. | |
| 8,394,977 B2 | 3/2013 | Tiefenbruck et al. | |
| 9,207,373 B2 | 12/2015 | Gelfant et al. | |
| 10,241,242 B2 | 3/2019 | Gelfant et al. | |
| 2002/0090515 A1 | 7/2002 | Pellerite et al. | |
| 2003/0036585 A1 | 2/2003 | Purgett et al. | |
| 2003/0069358 A1 | 4/2003 | Helland et al. | |
| 2003/0090800 A1 * | 5/2003 | Humpal | G02B 5/128 359/551 |
| 2003/0119945 A1 | 6/2003 | Aibara | |
| 2004/0157960 A1 | 8/2004 | Rowe | |
| 2004/0169928 A1 | 9/2004 | Nilsen et al. | |
| 2005/0015846 A1 | 1/2005 | Vistins et al. | |
| 2005/0032933 A1 | 2/2005 | Hermes et al. | |
| 2005/0282933 A1 | 12/2005 | Patel et al. | |
| 2009/0025872 A1 | 1/2009 | Nilsen et al. | |
| 2010/0221419 A1 | 9/2010 | Frey et al. | |
| 2010/0272962 A1 | 10/2010 | Davies | |
| 2011/0170193 A1 | 7/2011 | Budd et al. | |
| 2013/0034697 A1 * | 2/2013 | Shiao | B32B 27/36 428/147 |
| 2016/0209559 A1 | 7/2016 | McCarthy et al. | |
| 2017/0242165 A1 | 8/2017 | Bachman et al. | |
| 2018/0291175 A1 | 10/2018 | Wilding et al. | |
| 2020/0241180 A1 * | 7/2020 | Wilding | E01F 9/524 |
| 2021/0382211 A1 * | 12/2021 | Heikkila | E01F 9/524 |

OTHER PUBLICATIONS

3M Glass Bubbles Start something big by thinking small, 2018, St Paul MN, 55144.

Don McClure, Retroreflective Films: constructions, history, and applications, pp. 1-25, Ft. Pierce FL 34951.

James Kalchbrenner, Large Glass Beads for Pavement Markings, pp. 1-9, Transportation Research Record 1230.

Jay K. Lindly, Evaluation of Double Drop Beads Pavement Edge Lines, 2009, University Transportation Center for Mabama, UTCA Report No. 05409, Aug. 2009.

Life-Cycle Cost Analysis of Retroreflective Glass Beads, Tri-Service Pavements Working Gourp (TSPWG) Manual, Dept. of Defense, pp. 1-28, Jan. 24, 2018.

Paul Carlson, Importance of Pavement Marking Retroreflectivity Standards, p. 1-30, International Bridge, Tunnel and Turnpike Assoc., Texas A&M Transportation Institute.

Reflective Glass Beads, Chapter 2, pp. 1-20.

Richard L. Austin, Guide to Retroreflection and Saftey Principles and Retroreflective Measurements, pp. 1-32, 2009, RoadVista, San Diego CA 92131.

Ultimate Nightime Perfromance Wet or Dry, 2013, St Paul MN, 55144.

V Fang, A review of near infrared reflectance properties of metal oxide nanostructures, GBS Science Report 2013/39, Institute Of Geological And Nuclear Sciences, Jul. 2013.

* cited by examiner

COMPLEX RETROREFLECTIVE BEAD

CROSS REFERENCE TO RELATED APPLICATIONS

This application claims the benefit of U.S. Provisional Patent Application Ser. No. 62/751,065, filed Oct. 26, 2018, herein incorporated by reference in its entirety.

FIELD

The embodiments of the claimed materials relate generally to high reflectivity objects such as, for example, those used in highway striping and marking materials as well as to aesthetic applications, for example, countertops and safety applications. Specifically, the embodiments of this application relate to retroreflective beads used in highway striping and marking materials to enhance visibility of the highway, where striped and marked, especially during conditions of low light such as nighttime.

BACKGROUND

Pavement markings such as paints, tapes, and individually mounted articles that guide and direct motorists traveling along a roadway are known. During daylight the markings may be sufficiently illuminated by ambient light to effectively signal and guide motorists. At night, especially when the primary source of illumination is the vehicle's headlights, the markings may be insufficient to guide motorists because light from vehicle headlights hits the pavement and pavement markings at a very low angle of incidence, with the result that the light largely reflects away from the vehicle.

Retroreflection is the mechanism whereby light incident on a surface is reflected in a way that much of the incident light is directed back towards the light source. The most common retroreflective pavement markings, such as lane lines on roadways, are made by dropping transparent glass or ceramic optical elements onto a freshly painted line to which the optical elements become partially embedded in a hardened coating. Incident light desirably passes through the optical elements to the pavement marking paint or sheet, striking any pigment particles embedded therein. The pigment particles scatter the light. The scattered light includes a portion that is directed back into the optical element, which then redirects that portion of light back towards the light source.

In addition to providing desired optical effects, pavement markings must withstand road traffic, road maintenance, and adverse weather conditions, and are subject to cost constraints during manufacture and installation.

Vertically oriented or upwardly disposed surfaces provide good orientation for retroreflection. As a result, attempts have been made to incorporate vertical surfaces in pavement markings, such as by providing protrusions in the marking surface. Vertical surfaces may advantageously prevent build-up of water over the retroreflective surface diming rainy weather, which water would otherwise interfere with retroreflection.

Sometimes raised pavement markers are placed at intervals along a pavement marking line. These markers are relatively large, generally being several centimeters in width, and five to twenty millimeters in height. Typically, such markers require assembly of different components, some of which were previously individually molded or cast. Therefore, such markers are relatively expensive to manufacture. The size of the markers makes them subject to substantial impact forces from passing vehicles. As a result, the markers must be well secured to the pavement, increasing installation costs and removal costs when the markers must be replaced. Moreover, because the markers are applied at intervals, the reflected light provided by the markers are in the form of discontinuous spots of light. A continuous bright line of reflective light is more desirable. Improvements are needed.

Embossed pavement marking tapes represent an approach that has been taken towards providing better highway marking surfaces. Selective placement of transparent optical elements on the sides of embossed raised protrusions present in the tapes results in somewhat effective marking. However, such tapes are relatively expensive compared to painted markings and tend to pick up dirt that adheres to the tape even after a hard rain. As a result, tape usage is often limited lower traffic areas such as unlighted intersections and railway crossings. These embossed tapes are constructed with polymeric materials which are susceptible to wear.

Yet another approach to providing retroreflection is the composite retroreflective element. These retroreflective elements essentially have a core with smaller optical elements embedded onto the core surface. Some also contain optical elements dispersed throughout the core that become exposed with wear. The core may be irregular in shape or may be shaped as a sphere, tetrahedron, disc, square, tile, etc.

Some known retroreflective elements have centers formed of polymeric cores or binders. A pigmented core or binder may serve as a diffuse reflector, allowing spherical optical elements to be used on horizontal and vertical surfaces. Other constructions have transparent optical elements including specular reflectors such as metallic silver. The metallic surface directs light back towards the light source. In such cases pigmented cores are not used. Geometry of the optics may make a specular coated optical element less effective when embedded in pavement marking paint on a horizontal surface, and more effective when embedded in the vertical surfaces of a retroreflective support element.

Another retroreflective element construction uses silvered glass flakes as a specular reflector on the surface of a spherical polymeric core; no spherical optical elements are used.

Still another known construction has a retroreflective element with a plastic globule refracting incident light onto a layer of glass optical elements attached to the bottom of the globule. The glass optical elements focus light onto a specular coating or film located below the elements. Incident light is then reflected along the original path towards the source.

Shaped polymeric retroreflective elements with pigmented cores and glass optical elements embedded in the vertical surfaces are another alternative. These retroreflective elements are formed by extruding pigmented polymer into rods of different cross-sectional shapes. Glass optical elements are embedded into the surface of the polymer before it hardens, then the rods are sliced to form the elements.

Polymeric retroreflective elements are undesirably susceptible to wear, especially in high traffic regions, and to degradation due to weathering. To overcome these limitations, retroreflective elements have been constructed having a ceramic core surrounded by optical glass with a metallic specular coating.

One such construction approach is a rock or glass sphere core covered by a polymeric binder with glass optical elements having a specular metallic coating embedded in the polymeric coating. Another construction includes a glass sphere and a layer of glass optical elements attached to the bottom of the glass sphere with a polymeric binder. A metallic film below the glass optical elements acts as a specular reflector. However, these glass sphere-metallic film combination do not provide the brilliant white or yellow color for the reflective light that is desirable in a high-quality highway and is necessary to meet the requirements of many regulatory authorities. The glass sphere-metallic film approach tends to produce reflected light that is grey or silver, instead of white, or that is bronze or gold, instead of yellow. None of these are acceptable. Other constructions include a composite lens element serving both as a retroreflective element and a skid-resistant particle. The skid-resistant particle, which acts as a core, may be either a corundum particle or glass sphere, and is coated with a pigmented polymeric binder acting as a diffuse reflector.

A ceramic element having glass optical elements embedded throughout a glass core and at the core surface is another approach. A thin metallic film separates the optical elements and the glass core to provide an efficient specular retroreflective system. Alternatively, optical elements having a refractive index greater than 2.0 are used. These high refractive index optical elements are asserted as being capable of reflecting light without the need for a reflective backing.

Beads for highway marking with a polymer core, and beads consisting of all glass bonded to a glass core that is fabricated by melting these glass components together; there is no polymer core nor is any adhesive used are other options. U.S. Pat. No. 8,292,539 discloses a multiple bead agglomerate wherein the beads are connected by adhesive and silane.

Due to the limitations of the known reflective materials and structures, an improves reflection technology is needed that is easily made with high yield, is easily used in reflective products and has substantial retroreflectivity.

SUMMARY

An improved bead is made using an interfacial modifier (IM) to initially bond smaller beads onto a larger bead. This technology ensures that the smaller beads form a single layer the coats the larger bead. The resulting bead can be successfully sintered to bond the smaller bed to the larger bead with bead to bead binding and substantial removal of all existing organic components. In one of its embodiments this application provides a retroreflective bead article usable, for example, for highway marking having high retroreflectivity both when initially installed and over the bead lifetime, allowing vehicle drivers to see highway marking lines at night and in adverse conditions during nighttime. When installed the retroreflective beads essentially retroreflect the base color of the highway marking material in which the retroreflective beads are embedded.

In one of its several aspects this application provides a retroreflective device securable to a highway by bonding with a viscous strip applied to the highway prior to solidifying cure of the strip, where the device includes a generally large globular glass central component, and a plurality of peripheral smaller globular glass components connected to the central component by bonding of the particles under the influence of an interfacial modifier (IM) coating dispersed on the surfaces of the glass central component to the peripheral globular components to form the retroreflective bead. No adhesive is used during the bonding of the large and small glass components.

In yet another of its aspects this embodiment provides a retroreflective bead article, which after significant traffic passage thereover, wears at the top of the retroreflective bead but maintains retroreflectivity with retroreflectivity largely being produced at the side of the retroreflective bead, and with the exposed core central bead of the retroreflective bead being retroreflective after wear or abrasion of the peripheral bead components.

The retroreflective beads may be applied to a highway surface by trucks dropping exact amounts of the retroreflective beads on freshly applied highway and colored marking lines. The lines preferably utilize two component curing/reactive chemistries such as epoxy, epoxy hybrids, polyurethanes and polyureas and are often pigmented either yellow or light. However, the embodiments are not limited by the base color of the surface. When the retroreflective beads are applied, the line is flooded with the retroreflective beads that embed into the surface of the line. The line is ready for traffic in two to ten minutes, depending on the specific line chemistry used. Alternatively, the retroreflective bead article may be mixed with small, bare retroreflective beads known in the art.

A further embodiment is to apply the retroreflective beads to a highway by trucks dropping exact amounts of the retroreflective beads on freshly applied thermoplastic or latex colored paint.

Control of timing for the addition, mixing and heating of each component provides the desired properties of the final retroreflective bead product.

Retroreflective bead article performance characteristics can be measured in several ways: retroreflectivity of the bead by itself; retroreflectivity of the bead in a painted highway marking line; color of the line after addition of the retroreflective beads as compared to color without retroreflective beads; retroreflectivity of the line after wear testing with traffic; and color of the line with retroreflective beads after wear testing. ASTM E1710 for retroreflectivity and ASTM E1349 for color are the test methods used.

In other embodiments, the retroreflective bead article may be useful for aesthetic applications, for example, countertops and for safety applications for example vest, coats, and hats. Further applications are in the marine environment, such as, for example, navigation and safety buoys. Other marine uses are contemplated as well where retroreflective properties would be important and useful.

BRIEF DESCRIPTION

Figure 1:
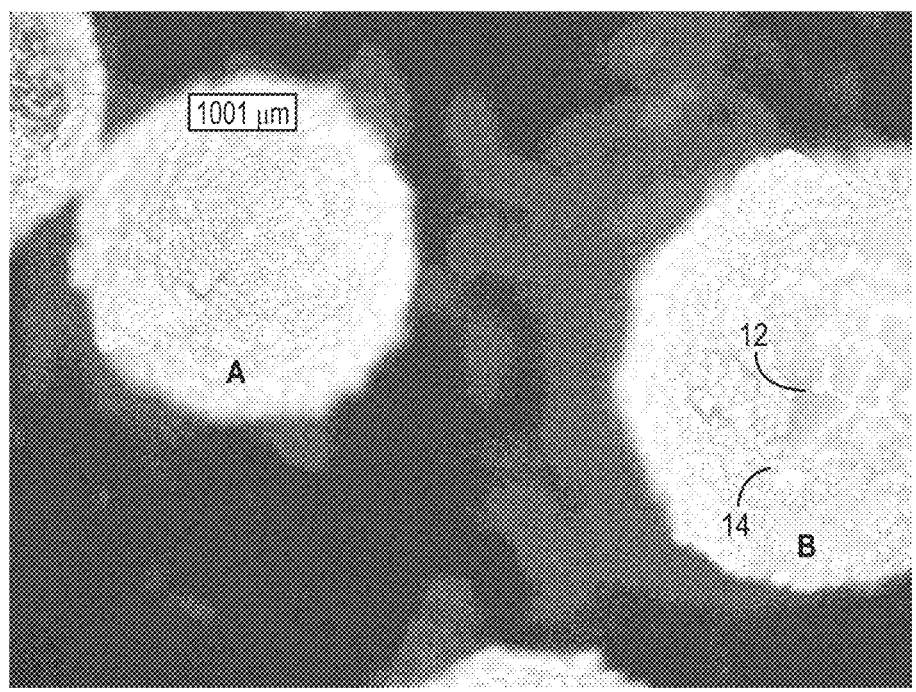
FIG. 1 is a picture of retroreflective generally spherical glass beads for highway marking in accordance with embodiments of the disclosure.

In fabricating retroreflective glass article where the glass bead article 10 consists of larger central globular glass components, the central bead or component 12, each having a plurality of smaller globular peripheral glass beads or components, the peripheral bead component, 14 connected to the central components 12, and the article are useful for highway marking or other applications, such as safety and signage, jackets, clothing, bicycles, or countertops, where retroreflectivity is useful.

The process to make the retroreflective glass article commences with collecting a supply of largely spherical, essentially clear, relatively larger globular glass central bead or component referred to sometimes herein as "beads", "particles" "particulate", or "spheres". Suitable amounts of an interfacial modifier are added to the large central beads surface and the resulting combination is mixed until the large beads have a controlled exterior coating of the interfacial modifier. Next the smaller peripheral glass beads, that are generally spherical or at least rounded in form, are added to the mixture of large beads coated with the interfacial modifier, but not dried, and the resulting new mixture of interfacially modified coated large beads and small beads are blended. The smaller beads can optionally contain an IM layer. During the blending phase, the small peripheral beads forms an ordered continuous layer on the surface of the larger central bead. Surface tension also known as capillary attraction forces between the central bead and the peripheral beads causes an ordered array due to the thin interfacial modifier layer(s). In the absence of the IM the peripheral bead does not associate with the central bead. An excess of IM prevents any useful association of peripheral bead to central bead. A small amount of interfacial modifier coating the large bead can be transferred to the surface of the small bead during this blending process. The surface effect of the interfacial modifier on the surface of the large bead is the contact point between the large and small beads. The amount or number of small beads added to the mixture can be adjusted to control the amount and extent of peripheral bead distribution on the central bead and tune the later bonding process. After mixing and blending the large and small glass bead components, a plurality of the smaller beads is ordered as a monolayer on the surface of the larger beads and can form a substantially complete coating.

In this practice of the embodiment, all of the processing, including mixing of the various beads and coatings, the time for the interfacial modifier to cover the surfaces of the initial group of larger beads and for self-ordering of the small beads to associate the small spherical glass members to the interfacially modifier surface of the larger glass beads to form the retroreflective glass bead article occurs in a short period of time.

In a more specific embodiment for fabricating retroreflective glass bead article, where the retroreflective glass article comprises larger central generally spherical glass components with each larger bead having a plurality of smaller peripheral generally spherical glass components heat bonded to the central bead components. The heat bonded retroreflective bead article provided will retroreflect any color such as, for example, either white or yellow according to the pigment(s) selected for incorporation into the highway marker, or other pigments that may be incorporated into countertops or safety equipment.

The method includes coating a supply of generally spherical essentially clear larger glass central components. About 0.2 to about 2 parts by weight of an interfacial modifier and is blended with the supply of the larger, spherical glass components into a mixture. The smaller glass components are blended into the coated mixture until the central larger generally spherical glass components are substantially covered by an array of the peripheral smaller components. The smaller peripheral components are ordered on the surface of the interfacial modifier that is coating the large central glass bead. The smaller peripheral components form a monolayer of small glass components over the large glass central components.

In another embodiment, the interfacial modifier may coat the large bead component and the smaller, simultaneously or separately, generally spherical glass components may comprise a coating of interfacial modifier, all relative to the small glass bead component. The large and small bead components are then mixed to provide a large central bead coated with an array of a plurality of smaller peripheral beads.

In a further embodiment, the method for fabricating retroreflective glass article consisting of larger central essentially spherical glass components, each having a plurality of smaller spherical glass components heat bonded to the central components, for providing either white or yellow reflective light, according to the color desired the interfacial modifier is about 0.1 to 3 or 0.2 to 2 wt. % relative to the large glass central bead component.

As in the above first described embodiments, all of the processing, including preparing the dispersion, mixing the various reagents, allowing time for the dispersion to cover the initial group of larger glass components and for the associating, resulting in the array of the small spherical glass components to the larger glass members, occurs quickly often over a period ranging from as little as about 30 seconds to a maximum of about many minutes.

In some embodiments, a kit comprising a plurality of individually packaged units of the heat bonded, retroreflective bead articles to be administered during application of the highway marking strip or during application to other surfaces requiring retroreflectivity are supplied with instructions for use. The individually packaged units may comprise heat bonded retroreflective beads all of one size. In another aspect, individually packaged units may comprise heat bonded retroreflective bead in mixed sizes. In another aspect, individually packaged units may comprise heat bonded retroreflective beads mixed with beads that are not heat bonded retroreflective beads.

The term "central" bead or sphere is a larger spherical object upon which the smaller peripheral spherical objects are arrayed.

The "peripheral" bead is a spherical article of substantially smaller diameter than the central bead that is arrayed upon the surface of the central bead.

The "array" of the peripheral beads is ordered by the distribution of the peripheral beads on the surface of the central beads in substantially a single layer or monolayer. The peripheral beads and the central beads are in contact at a point with one and each other of the bead components via the coating of the interfacial modifier that is heat treated to obtain a solid bond of atoms from the glass surface and the IM. The array can fully cover or partially cover the central bead.

A "retroreflective bead" is a central bead with an array of peripheral beads on its surface.

The term "heat bonded" means that the central bead is bonded to the array of peripheral beads at an interface structure comprising atoms from both the central and peripheral beads and non-volatile component of the interfacial modifier. In an embodiment, the heat bond is formed at a temperature below that of the glass in the beads and the beads retain their spherical nature except for the bond at the interface. The bond can comprise an alloy structure or a structure formed as atoms from the bead diffuses into the space between beads. The beads still maintain a separate structure spherical structure that is heat bonded to other beads, both large and small.

Heat Bonding

The key steps in making the retroreflective glass bead are 1) preparation of the large and small bead components being used for making the retroreflective bead, 2) coating the large globular central bead component and, optionally, the smaller globular peripheral bead components with interfacial modifier, 3) mixing the small bead components with the large bead components 4) obtaining an array of the small bead peripheral components onto the large bead central components; and 5) heating the large and small bead components to form a large complex bead with the large and small bead components heat bonded to form the ordered array of a plurality of small glass peripheral beads over the surface of the large bead components. The large bead component is well covered with the small beads on the surface of the large bead component through the effect of the interfacial modifier coated on the surface of the large bead component. In an embodiment the coverage of the array of small globular peripheral bead component over the large globular central bead component of the retroreflective glass bead article is substantially a single ordered layer, monolayer, of the small beads on each of the large beads in a mixture of the bead sizes. An ordered array of the small bead component on the interfacially modified surface of the large bead can be greater than 50, 60, 70, 80, 90, or 95% over the surface area of the large bead.

When heated to a bonding (sintering) temperature (preferably less than the melting point of any glass), at the bead interfaces, each adjacent bead and non-volatile portions from the interfacial modifier can combine to form a heated bond between beads with the large bead component being the center structure and the small peripheral bead component dispersed onto and heat bonded to the surfaces of the other large central components. Similarly, at contact points between peripheral beads, heat bonding processes can bond the adjacent peripheral beads forming a more stable surface array on the large central bead. Heat bonding is the process whereby beads bond together typically below the melting point by alloying, atomic diffusion or atomic transport events between beads and IM. The driving force is the combination of atoms at the interface and a reduction in the system free energy, manifested by decreased surface curvatures, and an elimination of surface area.

The interfacial modifier is essential to forming a stable layer on the larger bead that can be heat bonded. In the absence of the IM the beads do not associate. The IM on a bead surface(s) may cooperate in the heat bonding process with other interfacial modifier coatings on other beads to form the heat bonded product. The nonvolatile portion of the IM is a part of the final heat bonding structure. At the contact point either between the large central bead and small peripheral bead or between separate small peripheral beads adjacent to each other, a solid attachment or "neck" may be formed between either the large bead and small bead surface or between the surfaces of adjacent small beads. Not being bound by theory, the "neck" connecting the bead surfaces appears to be solid material that may have originated from the nonvolatile portion of interfacial modifier coating and uncoated grain boundaries between adjacent large or small beads and formed during heating. The neck appears to hold the smaller bead in a rigid posture relative to the surface of the large bead. This rigid posture aids in retroreflection of light beams by not allowing movement of the smaller peripheral bead and thus disruption of the light refracting and reflecting through the smaller peripheral bead surfaces. The neck may aid in durability and abrasion resistance. In some embodiments this neck or attachment at the contact point between either the large central or small peripheral beads may have some optical properties and may capture and reflect or scatter light directed through the glass beads. In some embodiments, the neck can be cylindrical or concave in shape and profile.

The interfacial modified surfaces that bond may be the same or different relative to the organic interfacial modifier. Due to the nature of the heat bonding process involving IM residue and glass components, heat bonding temperatures can be below a melting point of the glass. Temperatures we have used are about 700 to 800° C. A useful temperature is about 740 to 780° C. Heating time ranges from 15 to 120 seconds. A useful time is less than 60 seconds.

The useful steps in forming a retroreflective bead may be summarized as follows:
1) Large central, and optional small peripheral IM bead coatings of the surfaces,
2) Large central bead coated with IM mixing with small beads thereto ordering themselves to form an array of small peripheral beads on the surface of the interfacially modified coated large central bead.
3) Preparing the retroreflective glass bead to form a coated body or a preform.
4) Heating the retroreflective bead preform.
5) Post heating finishing.

Beads

The retroreflection of the retroreflective bead article is an important property of the embodiment. When light strikes a retroreflective bead, it is refracted and reflected through the bead. Refraction is the bending of the light. A bead's ability to bend light is measured by its index of refraction, which is a ratio of the sine of the angle of incidence to that of the refraction. The retroreflectivity of glass beads is better explained by examining the path of light as it enters a single retroreflective bead embedded in a surface such as, for example, highway paint, safety apparatus, or countertops.

As the light beam enters the retroreflective bead, the beam is bent or refracted downward. This beam then shines on the back surface of the smaller bead attached to the surface of the large bead, which is partially embedded in the paint, thermoplastic, countertop, safety equipment etc. The bead works like a mirror. If the surface was not present, the light would continue through the bead and bounce and scatter in many directions. This is one reason for proper retroreflective bead embedment depth in the surface. The light is bent (refracted) downward by the curved surface of the small beads to a point below where the retroreflective bead is embedded in the surface. Thus, when light is reflected off the surface at the back of the bead, a large portion of that light is reflected through the retroreflective bead and then refracted back toward your eyes.

The amount of refraction of light is characteristic of the glass composition and is known as the refractive index (R.I.) of the glass. The refractive index of the glass is dependent upon the chemical and physical make-up of the glass material. Various types of glass used in the construction of the glass bead have different indices of refraction and cause different amounts of light to be retroreflected. Water has an index of refraction of 1.33, while the typical single beads made with soda glass has a refractive index of 1.50. Contemporary beads used in the pavement marking industry, for example, are available in refractive indexes of 1.50, 1.65 and 1.90. The highest refractive material is 1.90 and is a very expensive bead to produce, Also, its durability is not as good as the soda glass type. Beads with a refractive index of 1.90 are generally called, "airport beads," since this type of bead is used to mark runways at airports. Useful glass material for the retroreflective bead of the embodiment have a refractive index of 1.50 for both the large and small beads.

Retroreflectivity is dependent upon the depth of the bead in a surface, for example, pavement marking material. Any exposed beads cannot survive harsh use conditions if not protected. Protection can be obtained by substantially covering or embedding the beads in the use structure components. For said pavement marking material, optimum depth of contemporary reflective beads in pavement marking material is often about greater than 30%, 35 to 80% or 50 to 60% of the larger bead diameter to maintain optimum retroreflectivity. Embedment of less than 50% may affect the longevity of the beads due to abrasion or crushing forces. Increasing embedment beyond 60% significantly decreases the amount of light that can be directed back to the driver. The retroreflective glass bead article somewhat alleviates this problem because of the monolayer of many small beads heat bonded to the surface of the large beads. A bead completely buried in the binder is non-retroreflective as no light enters the bead.

In summary, the amount of glass bead embedment will affect the retroreflectivity and the pavement line durability. For optimum retroreflectivity and durability, a bead should be embedded in a polymer layer of covered by a film at about greater than 30%, 35 to 80% or 50 to 60% of the larger bead diameter. Not all beads will be embedded 50-60%. Some beads will be completely buried more than 50% and others will be embedded less than 10%.

For the retroreflective glass bead article of the embodiment, the small beads arrayed on the periphery of the large bead presents many more curved surfaces for light to be transmitted, reflected, and refracted through the bead. The result is said beads can be embedded deeper into a surface such as pavement marking material without a loss of effective retroreflectivity as measured by suitable instrumentation. Further deeper embedment enhances the durability of retroreflective bead in the pavement line with resulting lower maintenance costs.

Solid glass beads or spheres (including both hollow spheres and microspheres and solid particulates) are useful materials in the embodiments. These spheres are strong enough to avoid being crushed or broken during further processing, such as by high pressure spraying, kneading, extrusion or injection molding. In some embodiments these spheres have particle sizes close to the sizes of other particulate if mixed as one material.

In some embodiments, the retroreflective bead article, either large central bead component or the small bead peripheral component, include at least one of various glass compounds including soda lime glass, borosilicated glass, high silica glass etc. In some embodiments that include silica, the silica can be, for example, fumed silica, precipitated silica, surface modified silica, or nano-silica. Some examples of such silica-containing particles include, for example, fumed silica available under the trade designation AEROSIL from Evonik Degussa, (Parsippany, N.J.); precipitated silica available under the trade designation FLO-GAD from PPG industries (Pittsburgh, Pa.), and nano-silica as described in, for example, U.S. Pat. No. 8,394,977, incorporated herein by reference.

In some embodiments the retroreflective bead article can comprise glass beads comprising aluminosilicate, boron trioxide, borophophosilicate, borosilicate, cobalt, fluorophosphate, fluorosilicate, germanium dioxide, lead glass, opaline glass, soda lime, sodium hexametaphosphate, sodium silicate, tellurite, thoriated glass, uranium glass, or vitrite. The use of these glass compositions or their mixtures are to provide specific characteristic to the glass bead media such as coloring, marking, durability, cost etc.

In some embodiments the beads can be shapes other than generally spherical. Such non-spherical shapes can include cubic, tetrahedral, pyramidal, etc. Spherical and non-spherical shapes can be mixed in the making of the retroreflective bead article depending on the application. An optimum sphere range of sizes of beads makes up a product which produces the maximum retroreflectivity and highway longevity. A combination of a larger and a smaller glass sphere wherein there is about 0.1 to 40 or 5 to 35 wt % of the smaller sphere and about 99.9 to about 75 or 95 to 65 wt. % of larger particles can be used were the ratio of the diameter of the larger particles to the ratio of the smaller is greater than about 2:1, 3:1, 4:1, 5:1, 6:1, 7:1, 10:1 or 12:1. Percentages based on the particulate. Optionally, glass beads used within the embodiments can include both solid and hollow glass spheres.

The smaller glass bead can be smaller than 300 microns, can be about 1 to 250 Microns or 10 to 100 microns and can be about 20 to 60 microns.

The larger glass bead can be as larger as 2 mm, can be about 200 microns to 1500 microns and can be about 500 to 1200 microns.

The ratio of diameters of the lager core beads to the smaller beads is greater than 7:1 and can be about 200:1. 100:1, 254:1 or 7:1. The smaller bead peripheral components cover the larger bead central component in an array (i.e.) substantially a monolayer over the surface of the central component. The surface array comprises about 50 to 100% coverage of a substantial monolayer. Both the central component and the peripheral components are of generally spherical configuration. The larger single glass beads that form the center of the retroreflective bead article in the embodiments are preferably Visibeae Plus beads available from Potters Industries, Inc. in Valley Forge, Pa. These beads range in size from 1.0 to 1.5 mm and have a high percentage population that are substantially spherical or round. Smaller beads can be obtained from 3M, Potters and other suppliers.

Interfacial Modifier

In an embodiment both the large central globular bead and small peripheral globular bead are typically coated with an interfacial surface chemical treatment also called an interfacial modifier (IM) that supports or enhances the final properties such as, rheology, high packing fraction, and bead surface inertness. These properties are not present in contemporary mixed materials. The beads can be coated with IM separately or the beads can be combined and then coated. Further, the large central bead can be coated with the interfacial modifier and the smaller peripheral globular beads can be arrayed upon the large central bead. An interfacially modified coated bead has a substantially complete coating of an interfacial modifier (IM) with a thickness of less than 1000 Angstroms often less than 200 Angstroms, and commonly 10 to 500 Angstroms (Å). An interfacial modifier is an organo-metallic material that provides an exterior coating on the bead promoting the close association or array, but not attachment or bonding, of large bead to small bead.

An interfacial modifier is an organic material, in some examples an organo-metallic material, that provides an exterior coating on the beads to provide a surface that can promote the tendency to associate or form an array with bead to bead contact. No reactive bonding, such as covalent bonding for example, of bead to bead occurs until the heat bonding step wherein the organic portions of the IM are volatilized, and the non-volatile portions cooperate with the glass components to form and enhance the bonding structure. The lack of reactive bonding between the bead components before heat bonding leads to the formation of a novel bead structure array. Thus, an interfacial modifier is not an adhesive because two surfaces are not being joined together to resist separation. In one embodiment, the coating of interfacial modifier at least partially covers the surface of the bead. In another embodiment, the coating of interfacial modifier continuously and uniformly covers the surface of the bead, in a continuous coating phase layer. The IM can be a liquid or solid at temperatures less than 35° C. Liquid IM is preferred for its ability to rapidly coat the larger central beds.

Interfacial modifiers used in the application fall into broad categories including, for example, titanate compounds, zirconate compounds, hafnium compounds, samarium compounds, strontium compounds, neodymium compounds, yttrium compounds, boron compounds, cobalt compounds, phosphonate compounds, aluminate compounds and zinc compounds. Aluminates, phosphonates, titanate and zirconate that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. In embodiments, the titanate and zirconate contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

In one embodiment, the interfacial modifier that can be used is a type of organo-metallic material such as organo-cobalt, organo-iron, organo-nickel, organo-titanate, organo-boron, organo-aluminate, organo-strontium, organo-neodymium, organo-yttrium, organo-zinc or organo-zirconate. The specific type of organo-titanate, organo-aluminates, organo-strontium, organo-neodymium, organo-yttrium, organo-cobalt, organo-zirconate which can be used and which can be referred to as organo-metallic compounds are distinguished by the presence of at least one hydrolysable group and at least one organic moiety. Mixtures of the organo-metallic materials may be used. The mixture of the interfacial modifiers may be applied inter- or intra-bead, which means at least one bead may has more than one interfacial modifier coating the surface (intra), or more than one interfacial modifier coating may be applied to different beads or bead size distributions (inter).

Certain of these types of compounds may be defined by the following general formula:

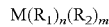

wherein M is a central atom selected from such metals as, for example, Ti, Al, Hf, Sa, Sr, Nd, Yt, B, Co, P, Zn, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer $\geq 1$ and m is an integer $\geq 1$. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic. $R_2$ is substantially unreactive, i.e. not providing attachment or bonding, to other particles or fiber within the composite material. Titanates provide antioxidant properties and can modify or control cure chemistry.

The use of an interfacial modifier results in workable viscosity for the large bead components. Minimal amounts of the modifier can be used including about 0.005 to 8 wt.-%, about 0.01 to 6 wt.-%, about 0.02 to 5 wt.-%, or about 0.02 to 3 wt.%. The IM coating can be formed as a coating of at least 3 molecular layers or at least about 50 or about 100 to 500 or about 100 to 1000 angstroms (Å).

Test and Measurement Procedures

The retroreflective glass bead article fabricated will be tested and measured for their retroreflectivity characteristics, for their compliance with applicable color specifications, for their pavement coverage characteristics, for resistance to abrasion, and for resistance to wear. The retroreflective glass bead article will be measured in characteristics and values, relative to these parameters, and compared to known commercially available reflective glass highway marking materials.

Retroreflectivity of the retroreflective glass bead article will be measured using the method set forth in ASTM Specification E1710 entitled "Test Method for Measurement of Retroreflective Pavement Marking Materials with CEN Prescribed Geometry Using Portable Reflectometer." In measuring retroreflectivity, the retroreflective glass bead article will be tested (i) alone within a line along a tape without any background paint, (ii) positioned alone on a tape after handling and packaging subsequent to manufacturing, (iii) with the retroreflective glass bead article alone on tape after a shake test (described below) of the retroreflective glass bead article, (iv) with the retroreflective glass bead article placed alone on a painted line, and (v) with the retroreflective glass bead article positioned together with standard glass beads used for highway marking on a painted line in a laboratory after the media and beads had been tested for wear according to the wear test described below.

Results from measuring retroreflectivity will be given for the examples and field trials below where retroreflectivity is expressed in millicandelas per square meter per lux, which is the unit of retroreflectivity as specified in ASTM E1710. All measurements of retroreflectivity will be made using a commercially available Mirolux retroreflectometer following the procedure set forth in ASTM E1710.

Color of the retroreflective glass bead article will be measured following the procedure set forth in ASTM E1349 entitled "Test Method for Reflectance Factor and Color by Spectrophotometer Using Bi-Directional Geometry" to determine compliance with ASTM D6628, entitled "Standard Specification for Color of Pavement Marking Materials," which is the applicable standard. One measurement of the color of the retroreflective glass bead article will be made with the article freely standing, being stacked one on another on a base. A second measurement of the color of the retroreflective glass bead article will be made with the article interspersed with standard highway marking glass beads on a painted line. A third measurement of the color of the retroreflective glass bead article will be made after retroreflective glass bead article were interspersed with standard glass highway marking beads on a painted line after wear testing pursuant to the wear test procedure described below.

For all of the retroreflective glass bead article, that will be fabricated according to the examples herein that will be set forth below, the color will always fall within the ASTM D6628 color box, and also within the more stringent State of Virginia color box for retroreflective glass bead article.

Evaluation of the coverage of the retroreflective glass bead article will be based on viewing retroreflective glass bead article under a microscope using from twenty to forty times magnification. The coverage afforded by the retroreflective glass bead article will be observed and empirical data recorded as retroreflectivity will be measured. This will be done (i) viewing the retroreflective glass bead media alone, immediately after manufacture, (ii) viewing retroreflective glass bead media alone after being handled and packaged in the manufacturing facility, and (iii) viewing the retroreflective glass bead media alone after haying undergone the shake test described below.

Retroreflective glass bead article will be further evaluated using a "shake test" designed to compare batches of retroreflective glass bead article one to another and to simulate severe abrasion of retroreflective glass bead article. In the shake test, fifty (50) grams of retroreflective glass bead article will be combined in a steel one pint can with one hundred (100) grams of grinding media, namely one-half inch by one-half inch Burundum ceramic media available from Fisher Scientific. The can will be then shaken vigorously for 60 seconds. After shaking, a 20-mesh screen is used to sieve out any loose, very fine generally spherical glass members. Material that passes through the 20-mesh screen, and hence is smaller than 20 mesh, will be then weighed and recorded as a percentage of the retroreflective glass bead media.

The applicant also will devise a wear test to expose a finished stripe, consisting of paint having retroreflective glass bead article and standard highway marking glass beads also applied thereto, to simulate exposure to severe continuous high-speed rubber wheel traffic. A sample stripe will be prepared on concrete with epoxy paint. Retroreflective glass bead article and standard highway marking beads will be applied to the epoxy paint stripe. Retroreflectivity is measured and color determined for the stripe, using the ASTM procedures and equipment described above, both before and after the test. For the test, four-inch diameter rubber wheels, each weighted down with twenty pound weights and spinning at a speed of 176 revolutions per minute, will be run on a ten-inch diameter track to which the epoxy paint stripe, the retroreflective glass bead article, and standard highway marking beads have been applied, for sixty (60) minutes, with a short interruption after each ten minute segment so that temperature does not rise too high due to fiction.

EXAMPLE 1

Into a one-liter container was placed 500 grams of the large-core bead component. A portion of the large-bead component was placed into a heated reaction vessel at room temperature. Into the container was added 2.5 grams of an interfacial modifier to the large-bead component in the container at a rate of about 0.5 parts of interfacial modifier per hundred parts of the large-bead component. The contents of the container were agitated until uniform and then placed into the room temperature reaction vessel and heated. The contents of the heated reaction vessel were agitated until uniform. The reaction vessel was then heated to 95° C. and maintained at that temperature for a short period leaving a coated large bead. Into 11 Coors ceramic crucibles were placed 35 grams of the interfacially-modified coated large-bead components. While the crucibles were not heated, the temperature of the interfacially-modified coated large-bead components was estimated to be between 80 and 90° C. Into each of the crucibles containing the modified large-bead components was placed 0.820 grams of a 3M iM16K hollow glass microsphere. Once the microspheres were added to each crucible, then the contents of each crucible were agitated until uniform mixing was achieved. The appearance of the large beads changed markedly. Initially, the large beads appeared to be relatively transparent glass beads. However, after adding the microspheres, the large beads became uniformly covered and looked as though they had a coating of a "powdered" surface comprising a uniform distribution of the hollow microspheres. After agitation, the contents of the crucibles appeared to be simply a distribution of microspheres coated large-bead components with no uncoated large-bead components and minimal, separate microspheres. The uniform bead contents of the crucible now at approximately ambient temperature were placed onto a heat-stable support plate and then placed into an oven. The crucibles and their contents were heated under the conditions of temperature and time in FIG. 5. The atmosphere in the oven was ambient atmosphere. The contents of the crucibles were removed and appeared to be a frangible, easily fractured, sintered mass. Each mass was compressed, and each sample fractured into a distribution of the microsphere-coated large-bead components. The material thus produced was then agitated for the purpose of removing excess microspheres, which were released into the atmosphere during break-up and agitation. The resulting coated spheres were rinsed with service water until the rinse water ran clear.

Into the container of the coated large beads was placed approximately 700 millimeters of service water, which was then agitated for five minutes for the purpose of ensuring that all unbonded microspheres were removed from the coated materials. The damp beads were then dried with a heat gun until fully dried of rinse water. Once dried, the beads acted as a free-flowing powder without agglomeration or adherence to containers or appliances. The resulting dry powder was then sieved to remove small particles. The overall yield of coated particles was about 381 grams (96.9% yield), having a specific gravity of 2.6062 grams per cubic millimeter. Visual inspection of the coated material showed that each large-bead component was substantially coated (greater than 95% surface area) of a single layer of microspheres. The microspheres appeared to be uniform in spacing. In dealing with the coated material and handling the material, once washed and sieved and dried, the microspheres appeared to be fully centered to the underlying large beads with a fused centered attachment. The beads and the microspheres did not appear to be changed physically by the process. The large beads appeared to maintain the initial diameter and composition, whereas the microspheres appeared to be the same as the starting raw material. Visual inspection of the coated microspheres showed the center halo of the beads, indicating that the microspheres maintained spherical character throughout the method of preparation. The following is a particle size analysis of the materials used. The glass formulation details are as follows in tables 1 and 2:

TABLE 1

Larger Particle Profile
Larger core particles

| Mesh | um | mass on | wt. % |
|---|---|---|---|
| 10 | 2000 | 0.00 | 0.00% |
| 16 | 1180 | 250.10 | 84.21% |
| 20 | 850 | 46.80 | 15.76% |
| 30 | 600 | 0.10 | 0.03% |
| pan | 0 | 0.00 | 0.00% |
| | | 297.00 | 100.00% |

TABLE 2

Smaller Particle Profile
Smaller particles

| Mesh | um | mass on | wt. % |
|---|---|---|---|
| 200 | 75 | 0.8 | 0.27% |
| 230 | 63 | 1.3 | 0.44% |
| 270 | 53 | 47.3 | 15.87% |
| 325 | 45 | 139.7 | 46.86% |
| 450 | 32 | 71 | 23.82% |
| 500 | 25 | 22.5 | 7.55% |
| 632 | 20 | 10.6 | 3.56% |
| pan | 0 | 4.9 | 1.64% |
| | | 298.1 | 100.00% |

Started heat profile bonding program: setpoints were as follows (under atmospheric gas conditions):

TABLE 3 temperature profile

| | ° C. | Time (Min) |
|---|---|---|
| 1 | 22 | 120 |
| 2 | 685 | 42 |
| 3 | 685 | 240 |
| 4 | 50 | −121 (end) |

Samples of each of the example, when viewed under conditions of minimal lighting showed substantial retro-reflective character.

DESCRIPTION OF THE DRAWINGS

Figure 2:
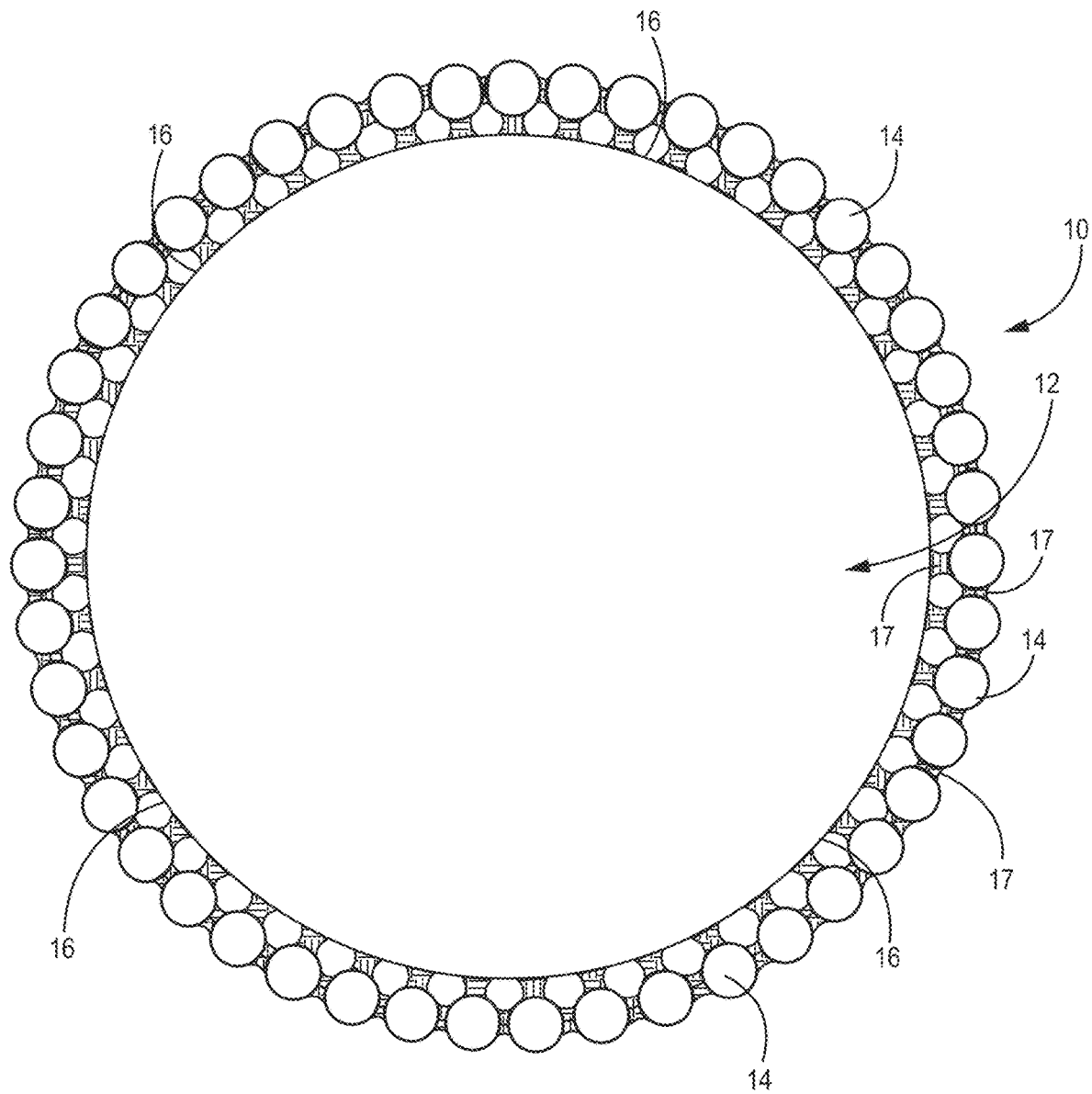
FIG. 2 is an artist's conception of a cross-sectional view the generally spherical glass beads shown in FIG. 1.
Figure 3:
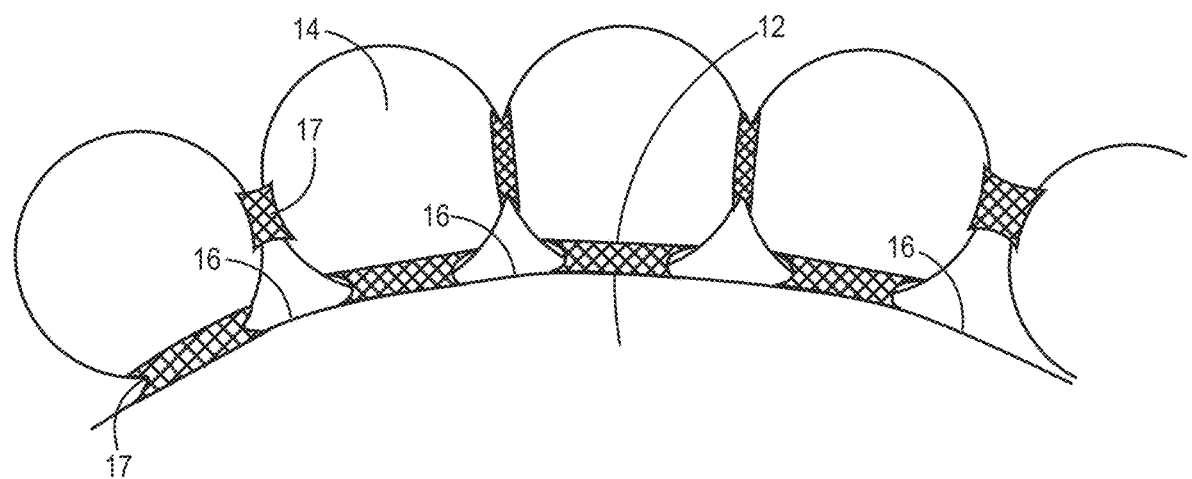
FIG. 3 is an artist's conception enlarged sectional view of a portion of the generally spherical glass beads for highway marking in accordance with embodiments of the disclosure, with the smaller exterior generally peripheral, spherical glass components.

Referring to FIGS. 1, 2 and 3, in FIG. 1 an image showing the retroreflective glass bead (10) in accordance with the embodiment with the exterior of the central retroreflective large glass central component (12) being essentially completely covered and exclusively defined by smaller generally spherical glass components, individual ones of which have been designated (14) in FIG. 1. Two complete retroreflective glass beads comprising small and large components are labelled A and B. The smaller peripheral and largely spherical glass components are distributed substantially in a monolayer over the surface of the larger mostly spherical glass components.

Referring to FIG. 2, an artist's schematic, the interior of retroreflective glass bead (10) is defined by a relatively larger generally spherical central glass component (12). The smaller generally spherical glass components (14), defining the exterior of retroreflective glass bead (10) as illustrated in FIG. 1, are visible in FIG. 2. Attachment of the smaller generally spherical glass components (14) to relatively larger generally spherical central glass component (12) is effectuated by a heat bonded attachment (17) through the interfacial modifier coating layer (16) in FIG. 2, FIG. 3, and FIG. 4. The smaller generally spherical glass peripheral components (14) are sufficiently attached by the attachment (17), the "neck", to adjacent smaller generally spherical glass components that the smaller generally spherical glass components (14) rigidly and fixedly form part of the retroreflective glass bead (10).

In FIG. 3, an artist's schematic, a broken portion of the relatively larger generally spherical central glass component (12) is depicted with several of the smaller generally spherical central glass components (14) attached through the IM coating layers (16), The "neck"(17) shows the attachment by the IM coating on the surface of the relatively larger generally spherical central glass component (12) to the smaller generally spherical central glass components. In FIG. 3, the attachment or "neck" (17) is depicted as consisting of a direct attachment through the IM coating (16) connecting the exterior of the central larger glass component (12) to the smaller glass peripheral components (14). Further the smaller glass components (14) can be connected to other smaller glass components (14) via said attachment, The heat bonded retroreflective bead is quite durable and stable in comparison to other glass bead constructions formed by adhesives or reactive coupling agents.

Figure 4:
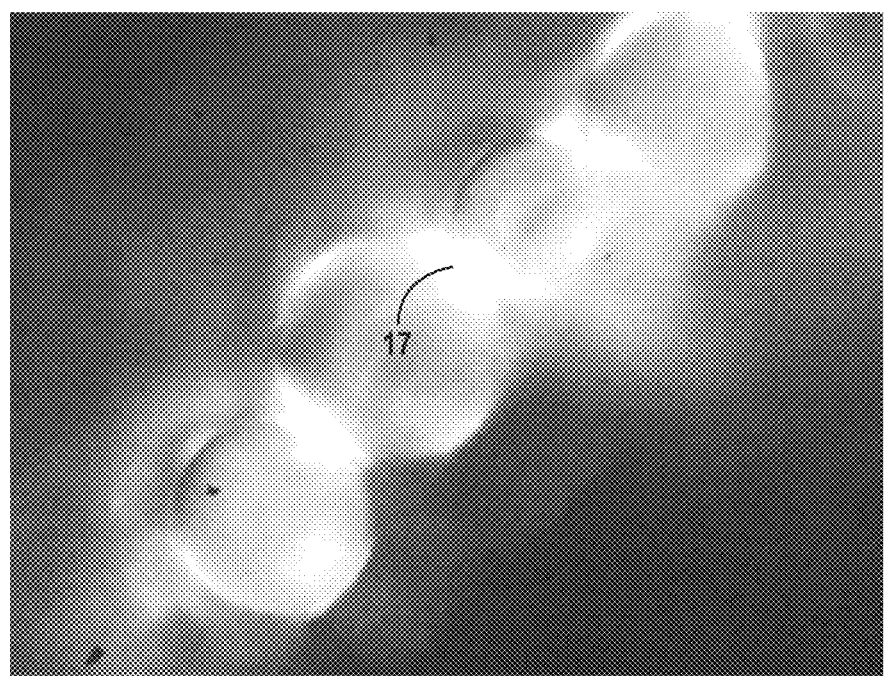
FIG. 4 is an image showing the attachment of the generally peripheral, spherical glass components to each other.

FIG. 4 shows, upon microscopic inspection of an image, a retroreflective glass bead (10) with a central spherical large glass components and the smaller general spherical peripheral glass components according to the embodiment. A heat bond (17) is clearly visible in the figure.

Average diameter of the relatively larger generally spherical central glass component designated in the drawings is about 1.2 millimeters, or about 0.85 millimeters to 1.4 millimeters, or about 0.6 to about 2.0 millimeters. The useful average diameter for the smaller generally spherical glass members designated (14) in the drawings is 75 μ, or about 60 μ to about 90 μ, or about 40 to about 200 μ.

Figure 5:
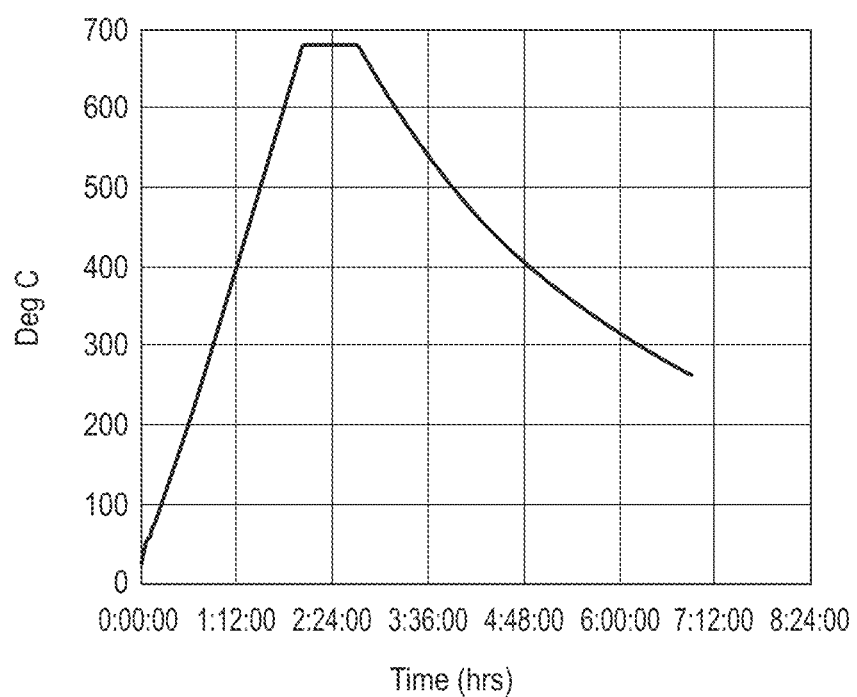
FIG. 5 is graph showing the time-temperature curve useful for heat bonding the large and small spherical glass components together. See Table 3.

FIG. 5 is a graph of the heating profile in Table 3.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

The specification shows an enabling disclosure of the composite technology, other embodiments may be made with the claimed materials. Accordingly, the invention is embodied solely in the claims hereinafter appended.

I claim:
1. A retroreflective article comprising:
  a. a glass central bead component coated with an organometallic interfacial modifier forming a coated bead; and b. a plurality of peripheral smaller globular glass components, forming surface array on the coated bead in the absence of a conventional adhesive;

wherein the combination of central glass bead, peripheral bead and interfacial modifier can be sintered to form the retroreflective article with the array of peripheral components bonded to the central glass bead.

2. The article of claim 1 in which the central component is in the range of from about 0.6 to about 2.0 mm and the peripheral component are in the range of from about 40 μ to 200 μ.

3. The article of claim 1 wherein the central component and peripheral components are heat bonded.

4. The article of claim 1 wherein the central component is of a generally spherical configuration.

5. The article of claim 3 wherein the peripheral components are of a generally spherical configuration.

6. The article of claim 1 wherein the interfacial modifier coating is applied to the central component at 0.2 to 2 wt. % based on the central component.

7. The article of claim 1 wherein the interfacial modifier coating is applied to the peripheral component at 0.2 to 2 wt. % based on the peripheral components.

8. The article of claim 1 wherein the interfacial modifier coating the central component comprises a continuous layer having a thickness of less than about 0.5 micron.

9. The article of claim 1 wherein the interfacial modifier coating the peripheral components comprise a continuous layer having a thickness of less than about 0.5 micron.

10. The article of claim 1 wherein a ratio of diameter of globular central component to the peripheral globular glass components is greater than 10:1.

11. The article of claim 1 wherein a ratio of diameter of globular central component to the peripheral globular glass components is greater than 15:1.

* * * * *